3,119,932
POLYPHASE CURRENT SWITCHING DEVICE FOR AN X-RAY TUBE SUPPLY CIRCUIT
Joseph Hubert Marie Lucas, Eindhoven, Henricus Jacobus van Dal, O'Dijk, and Wigle Foppe Smits, Eindhoven, Netherlands, assignors to North American Philips Company, Inc., New York, N.Y., a corporation of Delaware
Filed Feb. 3, 1961, Ser. No. 86,986
Claims priority, application Netherlands Feb. 12, 1960
9 Claims. (Cl. 250—102)

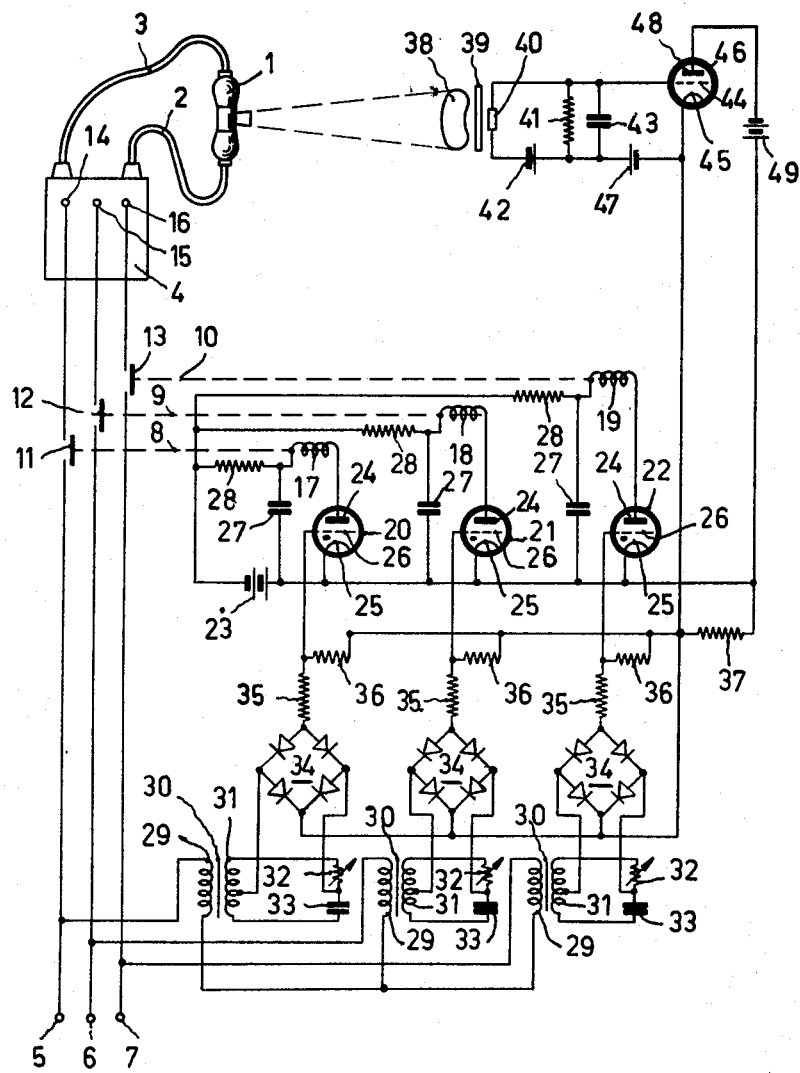

It is known to use an electro-magnetic switch to switch on and off three-phase current circuits, which switch for each of the three phases comprises a switching arm with magnetic energization. Each switching arm is moved separately from the operational position into the rest position, so that it interrupts the current.

The invention relates to an X-ray apparatus comprising such a switch. In accordance with the invention the energizing currents required to move the switching arms into the rest position are controlled by electrical voltage pulses, of which the potential level corresponding to the peak height of the pulses can be changed from a height at which no adequate energizing current is produced to a height at which an adequate energizing current is produced, while subsequent to the change of the potential level the next-following pulse actuates one of the switching arms. Provision is furthermore made of a device to change the phase with which these pulses occur.

The interruption of the alternating supply current for an X-ray apparatus is preferably to take place at the instant when the current is zero or at least shortly before the alternating-current curve passes through the zero position. The period during which the alternating current increases from zero to a maximum value and even a longer period is not favorable for the interruption of the current, since then sparks are produced which damage the contacts of the switch and produce uncontrollable prolongations of the loading period, which may be harmful to the image quality in making radiographs.

The phase difference between the currents in the various supply conductors of a three-phase current circuit renders a simultaneous interruption of the three phases very disadvantageous. When using a switching device having separately movable switching arms, a separate actuation of at least two of the switching arms renders it possible to interrupt the phase currents at the correct instants.

In an X-ray apparatus use is made of a three-phase high-voltage generator, since shorter switching periods can be thus obtained and the load for making such short-time radiographs is very high. Since a three-phase generator for rectified alternating current of 50 c./s. supplies currents passing the zero line at intervals of 1/300 sec., a very accurately operating switching device is required. As compared with a known device in which energizing currents derived by inductive means from the phase currents are employed, the control of the switching arms by means of pulses in accordance with the invention has the advantage that substantially no other delays than the inertia of the moving parts of the switch are operative, while, moreover, the instant when the pulses are produced can be readily controlled.

The electrical pulses can become operative with great certainty without unwanted delays at an accurately determined instant, if they are not to supply at the same time the energy for energizing the magnetic current circuit of the switch. The component parts of the electrical current producing the pulses may be small, when pulses of low power are used and they thus occupy little space. For controlling the energizing currents by the voltage pulses use is made of gas-filled discharge valves including control-grids.

It is a further advantage of the use of low-power pulses that the phase shift of the pulses can be rendered adjustable in a simple manner. A control-device suitable to this end comprises a variable resistor and a capacitor connected in series therewith. The instant when each pulse becomes operative can thus be chosen with respect to the zero points of the phase currents separately for each switching arm so that between the occurrence of the pulse and the interruption of the current the same amount of time elapses as the time required for the switching arms, owing to the delay, to be moved from the operational position into the rest position.

The embodiment of a device according to the invention shown in the drawing comprises an X-ray apparatus, in which the exposure time for making radiographs is measured by an electronic time switch.

The X-rays emanate from the X-ray tube 1, which is connected by cables 2 and 3 to the generator 4 for high voltages. The generator 4 is fed from an alternating current supply. For switching the supply currents on and off, use is made of an electro-magnetic switch. The three phases of the alternating current supply, 5, 6 and 7, are connected by contacts 11, 12 and 13, actuated by separate switching arms 8, 9 and 10, to the terminals 14, 15 and 16 of the generator 4. By the mechanical displacement of the switching arms the contacts can be closed. For opening these contacts use is made of a control circuit comprising electro-magnetic energizing coils 17, 18 and 19. The current circuits of each of these coils include gas-filled discharge valves 20, 21 and 22, which, as will become apparent hereafter, are arranged to be triggered into conduction at predetermined instants of time relative to the supply voltage variations. The current source 23 supplies the energizing currents for each of the coils.

Each of the discharge valves has an anode 24, a cathode 25 and a control-electrode 26. With each discharge valve and each energizing coil, there is connected in series a capacitor 27, which is connected to the current source 23 via a high value resistor 28. The switching movement is carried out by the discharge of the capacitors 27 via the coils to be energized 17, 18 and 19 and the discharge valves 20, 21 and 22. The discharge is prevented by a voltage level which holds the potential of the control-electrodes below a value at which ignition can take place.

In order to ignite the discharge valves at given instants, two voltages are fed to the control-electrode 26, i.e. a constant voltage and a rectified alternating voltage superimposed on the former in a negative sense. These voltage are obtained by means of an arrangement comprising three phase controllers. The primary windings 29 of three transformers 30 are connected to the supply mains in star connection. The secondary windings 31 are shunted by the series combination of a variable resistor 32 and a capacitor 33. To the central tapping of the secondary winding 31 and to the junction of the resistor 32 and the capacitor 33 is connected a four-valve circuit 34. One of the two further terminals of each of these circuits is connected via a resistor 35 to the control-electrode 26 of one of the discharge valves 20, 21 and 22. All further terminals of the four-valve circuits are connected to each other and via the resistors 36 also to each of the control-electrodes 26. The voltage supplied to the rectifying circuit 34 amounts to approximately half of the voltage across the secondary windings 31. With each combination of a resistor 32 and a capacitor 33 the phase of this voltage is adjustable with respect to the primary voltage by varying the resistor 32. Consequently, a phase shift of the voltage obtained from the rectifying circuits 34 may be obtained. This voltage occurs between the non-interconnected ends of the resistors 35 and 36. The ratio between these resistors determines that part of the voltage which is fed to the control-electrodes 26. The interconnected ends of the resistors 36 are connected via the resistor 37 to the cathodes 25 of the discharge valves 20, 21 and 22. The grids of these valves are connected to the other end of each of the resistors 36 and this end has a pulsatory negative potential with respect to the end connected to the cathodes.

The grid voltage of the discharge valves 20, 21 and 22 thus has a negative pulsatory component formed by part of the output voltage of the rectifying circuits, and owing to the aforesaid phase shift, the phase of this grid-voltage component may also be varied.

When the X-ray tube is operative, initially no current flows through the resistor 37 and the aforesaid negative grid-voltage component prevents the gas discharge valves from igniting.

When the X-ray tube 1 is rendered operative by closing the master switch 8, 9, 10, the object and the photographic plate 39 are struck by X-rays. Behind the photographic plate 39 is arranged an X-ray sensitive measuring cell 40. When using an ionization chamber as a measuring cell, an electric current is produced across the current circuit comprising the measuring cell 40, the resistor 41 and the voltage source 42. Thus a voltage is produced across the resistor 41, which charges the capacitor 43. The capacitor 43 is connected to the control grid 44 and the cathode 45 of an electronic valve 46. This current circuit includes the grid-voltage source 47, of which the polarity is chosen so that, when the capacitor is not charged, the grid 44 is negative to the cathode 45 and the valve 46 does not supply current. Owing to the charge of the capacitor 43, the potential of the grid 44 increases. After a given value is reached, a current flows through the current circuit connecting the anode 48 to the cathode 45 via the anode-voltage source 49 and the resistor 37.

The voltage across the resistor 37 constitutes a second, constant positive component of the grid voltage of the discharge valves 20, 21 and 22. This voltage increases the potential level of the voltage pulses acting upon the grids to an extent such that the pulse peaks bring about the ignition of the valves.

The instant when the pulse voltage exhibits the peak value relative to the zero passage of the phase current to be switched off, is to be chosen separately for each of the switching arms of the magnetic master switch. The primary voltages of the transformers 30 are co-phase to the conductor voltages of the supply mains, so that between the secondary voltages of the transformers 30 phase angles of 120° are found. The pulses produced by the rectification of these voltages thus have a mean difference of 60°. By varying the adjustable resistors 32, each of these phases can be varied, so that the instant can be determined, when within the time of half a period of the associated phase of the supply voltage the ignition pulse occurs. Thus by a suitable choice of the said instant it may be ensured that the phases are interrupted at or shortly before the zero passages of the currents, so that interruption sparks are avoided.

What is claimed is:

1. Apparatus for switching a polyphase alternating current supply to a load device including an X-ray tube comprising switch means having a plurality of individually operable circuit-breaking means interposed in each circuit between the alternating current supply and the load, phase shift means connected to said alternating current supply for producing voltage pulses in predetermined phase relation to said alternating current supply, means responsive to a predetermined condition of said load device for varying the effective amplitude of the pulses, and means responsive to said voltage pulses for individually actuating each of said circuit-breaking means at predetermined times relative to the individual current phases of the alternating current supply.

2. Apparatus for switching a polyphase alternating current supply of a given frequency to a load device including an X-ray tube comprising switch means having a plurality of individually operable circuit-breaking means interposed in each circuit between the alternating current supply and the load, phase shift means connected to said alternating current supply for producing voltage pulses of a given periodicity equal to twice the frequency of said alternating current supply and predetermined phase relation to said alternating current supply, means responsive to a predetermined condition of said X-ray tube operative to produce a varying voltage level, means for combining said voltage pulses with said voltage level, and means responsive to said combined voltages for individually actuating each of said circuit-breaking means at predetermined times relative to the individual current phases of the alternating current supply.

3. X-ray apparatus comprising a three-phase source of alternating current having an output conductor individual to each supply phase, a load for said current source including an X-ray tube, a switching device having a plurality of switching arms, each of said arms being individually connected in series with an output conductor and the load, phase shift means connected to said current source and arranged to supply voltage pulses in predetermined time relation to the current source, a control circuit connected to said phase shift means, means operative at the termination of an X-ray energization period to produce a predetermined voltage level, means for coupling said voltage pulses and said voltage level to the control circuit, said control circuit being responsive to the combination of said voltage level and said voltage pulses to actuate said switching device to operate each of said switching arms at predetermined times relative to the current in the output conductor in which the switching arm is connected.

4. Apparatus as described in claim 3, wherein each of said switching arms is operated at a point of substantially zero current in its associated output conductor.

5. Apparatus as described in claim 3, wherein said phase shift means is adjustable to supply time variable voltage pulses.

6. X-ray apparatus comprising a three-phase source of alternating current having output conductors individual to each supply phase, a load for said current source including an X-ray tube, a switching device having a plurality of switching arms individually connected in series with each of said output conductors and the load, a plurality of phase shift circuits each connected to a separate output conductor, a plurality of rectifier devices individually connected to each of said phase shift circuits and arranged to supply unidirectional voltage pulses in predetermined time relation to the alternating current in its associated output conductor, means operative at the termination of an X-ray energization period to produce a predetermined voltage level, means for combining said voltage pulses with said voltage level, a plurality of control circuits, each connected to a separate rectifier device and responsive only to its associated combined voltages to actuate the switching device, each of the switching arms of said switching device being individually operable at predetermined times relative to the current in its associated output conductor.

7. Apparatus as described in claim 6, wherein each of said control circuits includes a gas discharge device having a control electrode and wherein said switching device is an electromagnetic switch having individual energizing coils for each switch arm, each of said coils being connected in circuit with a gas discharge device.

8. Apparatus as described in claim 7, wherein said control circuits further include individual capacitors and said gas discharge devices have anodes, each of said anodes being serially connected with its associated energizing coil and capacitor, said combined voltages being applied to the control electrodes to cause conduction of the gas discharge devices, the discharge of said capacitors through said gas discharge devices and coils supplying the energizing currents for the switching device.

9. Apparatus as described in claim 8 wherein each of said phase shift circuits includes means for individually adjusting the relative phase of the voltage pulses produced by its associated rectifier device and wherein each of said control circuits is individually associated with a predetermined one of said phase shift circuits, the voltage pulses produced by each of said phase shift circuits being supplied only to its associated control circuit, said means for combining being connected in circuit so as to be common to all of said control circuits.

References Cited in the file of this patent

UNITED STATES PATENTS

| | | |
|---|---|---|
| 2,117,908 | Okawa et al. | May 17, 1938 |
| 2,288,338 | Willis | June 30, 1942 |
| 2,752,509 | Zavales | June 26, 1956 |
| 2,809,296 | Godbarsen | Oct. 8, 1957 |

FOREIGN PATENTS

| | | |
|---|---|---|
| 1,209,226 | France | Feb. 29, 1960 |